United States Patent
Johnson et al.

(10) Patent No.: US 6,693,244 B2
(45) Date of Patent: Feb. 17, 2004

(54) METHOD AND APPARATUS FOR RETROFITTING AN EXISTING CONVEYOR TO INCLUDE A FACTORY CALIBRATED WEIGHING DEVICE

(75) Inventors: Thomas Johnson, Winnebago, MN (US); David L. Boren, Sebastopol, CA (US)

(73) Assignee: Weigh-Tronix, Inc., Fairmont, MN (US)

( * ) Notice: Subject to any disclaimer, the term of this patent is extended or adjusted under 35 U.S.C. 154(b) by 0 days.

(21) Appl. No.: 10/124,861

(22) Filed: Apr. 17, 2002

(65) Prior Publication Data

US 2003/0132036 A1 Jul. 17, 2003

Related U.S. Application Data

(60) Provisional application No. 60/349,864, filed on Jan. 17, 2002.

(51) Int. Cl.⁷ .................... G01G 23/01; G01G 21/28
(52) U.S. Cl. ................ 177/126; 177/128; 177/145; 73/1.13
(58) Field of Search ................ 177/126, 127, 177/145, 119, 128; 73/1.13

(56) References Cited

U.S. PATENT DOCUMENTS

| | | | | |
|---|---|---|---|---|
| 4,463,816 A | * | 8/1984 | MacFarlane | 177/119 |
| 5,285,019 A | * | 2/1994 | Kempf et al. | 177/119 |
| 5,294,756 A | * | 3/1994 | Lauber et al. | 177/119 |
| 5,296,654 A | * | 3/1994 | Farley et al. | 177/145 |
| 5,338,901 A | * | 8/1994 | Dietrich | 177/119 |
| 5,600,104 A | * | 2/1997 | McCauley et al. | 177/136 |
| 5,696,354 A | * | 12/1997 | Linville, Jr. et al. | 177/119 |

* cited by examiner

Primary Examiner—Randy Gibson
(74) Attorney, Agent, or Firm—Gray Cary Ware & Freidenrich LLP

(57) ABSTRACT

An integrated element scale is provided that can replace an existing support structure within a piece of equipment to achieve a piece of equipment with the integrated scale. The integrated element scale may contain one or more load cells and be configured to replace a standard component used in the assembly of certain types of equipment. The integrated element may include a mechanism to align the load portion and support portion of the element with the load cell or load cells in between them. The integrated element may further include a mechanism for protecting the load cells from damage due to overload or under load as well as side impacts. When higher accuracy is required, the integrated element further may include a mechanism for decoupling the loads within each element from other load cells within the same element or other elements so that horizontal loading between the deflecting load cells does not occur. The integrated element further may include a mechanism for locking the element in an aligned position so it may be adjusted and tested prior to installation.

60 Claims, 11 Drawing Sheets

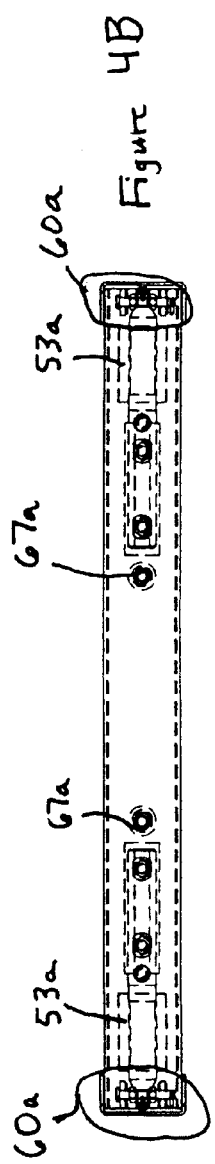
Figure 4B
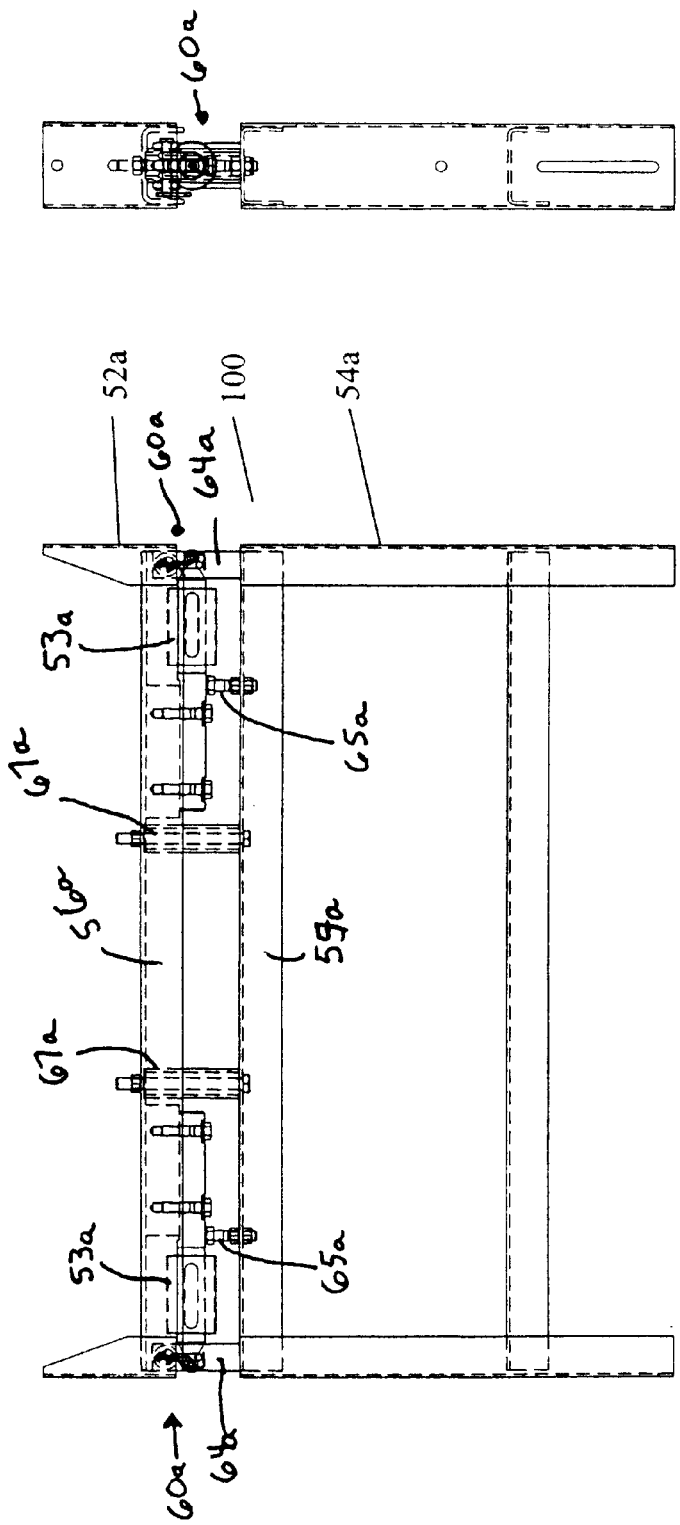
Figure 4C
Figure 4A

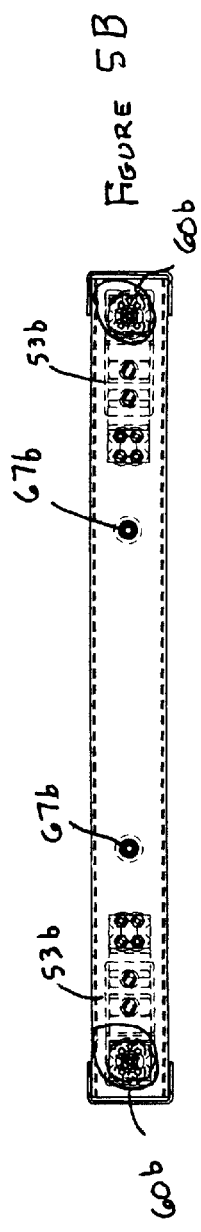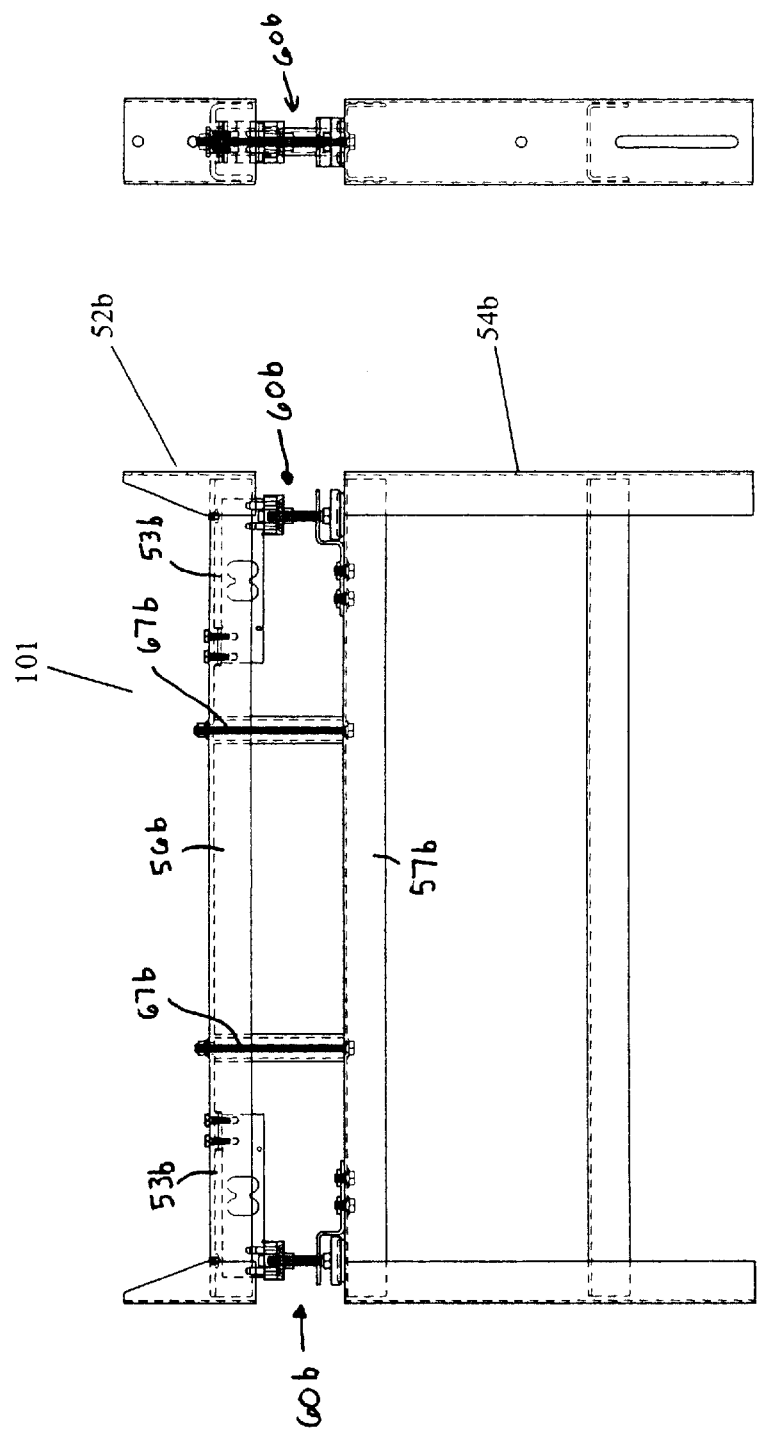

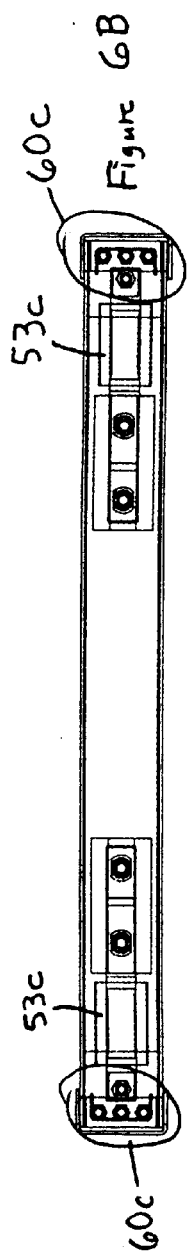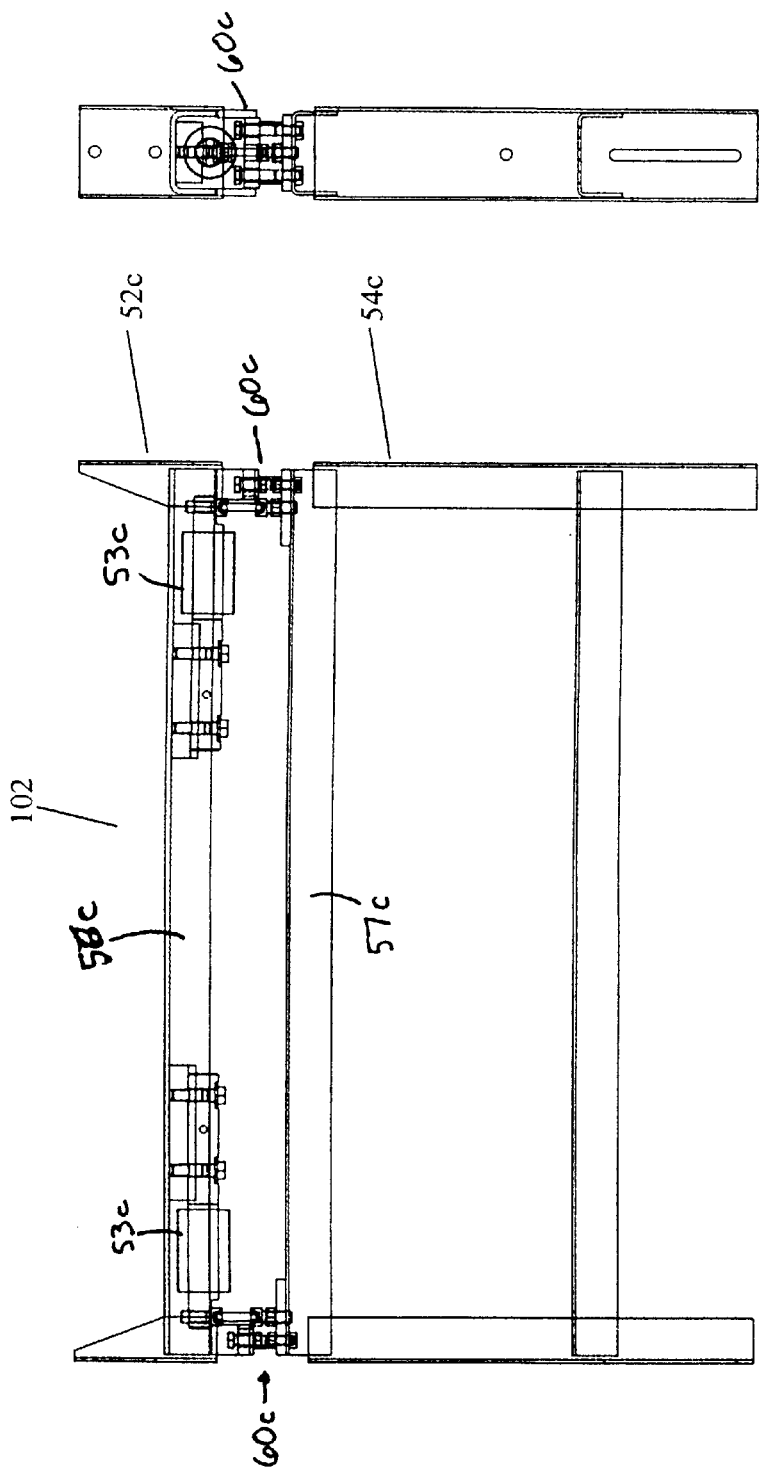

METHOD AND APPARATUS FOR RETROFITTING AN EXISTING CONVEYOR TO INCLUDE A FACTORY CALIBRATED WEIGHING DEVICE

RELATED APPLICATION

This application claims priority under 35 USC 119 and 120 from U.S. Provisional Patent Application Ser. No. 60/349,864, filed on Jan. 17, 2002 and entitled "Integrated Element Scale".

FIELD OF THE INVENTION

This invention relates generally to a system and method for weighing an article and in particular to a weighing scale.

BACKGROUND OF THE INVENTION

Different devices for weighing an article are well known and in common use throughout the world. The devices, such as scales, are used for a variety of different purposes. In the business of trading and shipping, scales serve the necessary role of determining the weight of the article being shipped or traded for so that the appropriate price for shipping the article of buying the article may be determined. Often, there may be equipment that has a scale integrated into the equipment. For typical production equipment that requires an integrated scale, the entire structure of the equipment is built with the load cells mounted in it. This requires that the scale manufacturer build equipment in a much more complicated manner than for a simple scale. This complicated equipment with the integrated scale is not a typical product for the scale manufacturer and thus adds a great deal of cost to the scale because of inexperience of the scale manufacturer and the low quantities of the integrated scale product equipment that is produced. In the past, to build equipment with an integrated scale, individual load cell assemblies were built into place under or within the equipment in order to transform the equipment into a scale. This prior technique, however, required modification of the equipment which created several problems including altering the height of the structure, occupying too much space or causing load cell alignment issues. Thus, it is desirable to provide an integrated element scale in accordance with the invention that overcomes the above limitations and problems with typical integrated scale equipment and it is to this end that the present invention is directed.

SUMMARY OF THE INVENTION

The present invention provides an integrated element that can be used to replace an existing support structure within the equipment to provide the equipment with the integrated scale. This integrated element contains the load cells required to provide the scale function without modifying the rest of the equipment substantially. In addition, the load and support adapter portions are provided with a load cell or load cells connecting them.

In more detail, the integrated element may contain one or more load cells and be configured to replace a standard component used in the assembly of certain types of equipment. The integrated element may include a mechanism to align the load portion and support portion of the element with the load cell or load cells in between them. The integrated element may further include a mechanism for protecting the load cells from damage due to overload or under load as well as side impacts. When higher accuracy is required, the integrated element further may include a mechanism for decoupling the loads within each element from other load cells within the same element or other elements so that horizontal loading between the deflecting load cells does not occur. The integrated element further may include a mechanism for locking the element in an aligned position so it may be adjusted and tested prior to installation. Then, the tested integrated element may be assembled into the equipment ready for operation without excessive adjustments other than those already available in the component replaced.

The integrated element scale in accordance with the invention provides many advantages.

For example, the manufacture of certain types of equipment may offer the scale feature as an option to standard equipment without modifying components of the equipment. Furthermore, the installed equipment may be retrofitted easily with the integrated element by removing standard components and replacing them with the integrated scale elements in accordance with the invention.

As an example, the leg assemblies under a conveyor or table could be replaced with elements having load-sensing capabilities in accordance with the invention thereby transforming the conveyor or table into a scale. Thus, anything then placed on the conveyor or table could then be weighed immediately without moving it to a separate scale. In accordance with the invention, the cost of scale installation into the equipment is only incremental to the cost of the scale elements and not the cost of the supported equipment that would be required without the scale.

Thus, in accordance with the invention, a piece of equipment having an integrated scale is provided. The piece of equipment has a surface that supports an article and a structure that supports the surface and an integrated element scale that is capable of weighing an article on the surface of the piece of equipment which is integrated into the support structure of the piece of equipment. The integrated element scale has a support section that connects to the support structure and a sensor section, connected to the support section, with at least one force sensor and at least two force decouplers separated by a distance to provide alignment in at least one direction. The integrated element scale also has a load section, connected to the sensor section and the surface of the piece of equipment, that transfers the weight of the article to the sensor section.

In accordance with another aspect of the invention, an integrated element scale that is capable of weighing an article on a piece of equipment that is integrated into the support structure of the piece of equipment is provided. The integrated element scale has a support section that connects to the piece of equipment and a sensor section, connected to the support section, with at least one force sensor and at least two force decouplers separated by a distance to provide alignment in at least one direction. The integrated element scale further comprises a load section, connected to the sensor section and the piece of equipment, that transfers the weight of the article to the sensor section.

In accordance with another aspect of the invention, a method for retrofitting a piece of equipment with an integrated element scale is provided. In a first step, the support structure of the piece of equipment is removed. In a second step, an integrated element scale is placed onto the piece of equipment so that the piece of equipment is able to weigh an article resting on the piece of equipment using the integrated element scale.

In accordance with yet another aspect of the invention, an integrated element scale that is capable of weighing an article on a piece of equipment that is integrated into the support structure of the piece of equipment is provided. The integrated element scale has a support section that connects to the piece of equipment and a sensor section, connected to the support section, with at least one force sensor and at least two force decouplers separated by a distance to provide alignment in at least one direction. The scale also has a load section, connected to the sensor section and the piece of equipment, that transfers the weight of the article to the sensor section and a fixing device that fixes the positional relationship between the support section, the sensor section and the force decouplers so that the force sensing means is pre-calibrated prior to installation into the scale.

BRIEF DESCRIPTION OF THE DRAWINGS

FIGS. 4A, 4B and 4C are a front elevation view, a top elevation view and a side elevation view, respectively, of one embodiment of a integrated element in accordance with the invention using vertical flexures and a shackle as a decoupling mechanism;

FIGS. 5A, 5B and 5C are a front elevation view, a top elevation view and a side elevation view, respectively, of another embodiment of a integrated element in accordance with the invention using a rubber support as a decoupling mechanism;

FIGS. 6A, 6B and 6C are a front elevation view, a top elevation view and a side elevation view, respectively, of another embodiment of a integrated element in accordance with the invention using a rocker pin and cups as a decoupling mechanism;

DETAILED DESCRIPTION OF A PREFERRED EMBODIMENT

The invention is particularly applicable to a table having an integrated scale and it is in this context that the invention will be described. It will be appreciated, however, that the integrated element scale in accordance with the invention has greater utility since it may be added onto various different products and production equipment to retrofit typical equipment with an integrated scale in accordance with the invention.

Figure 1:
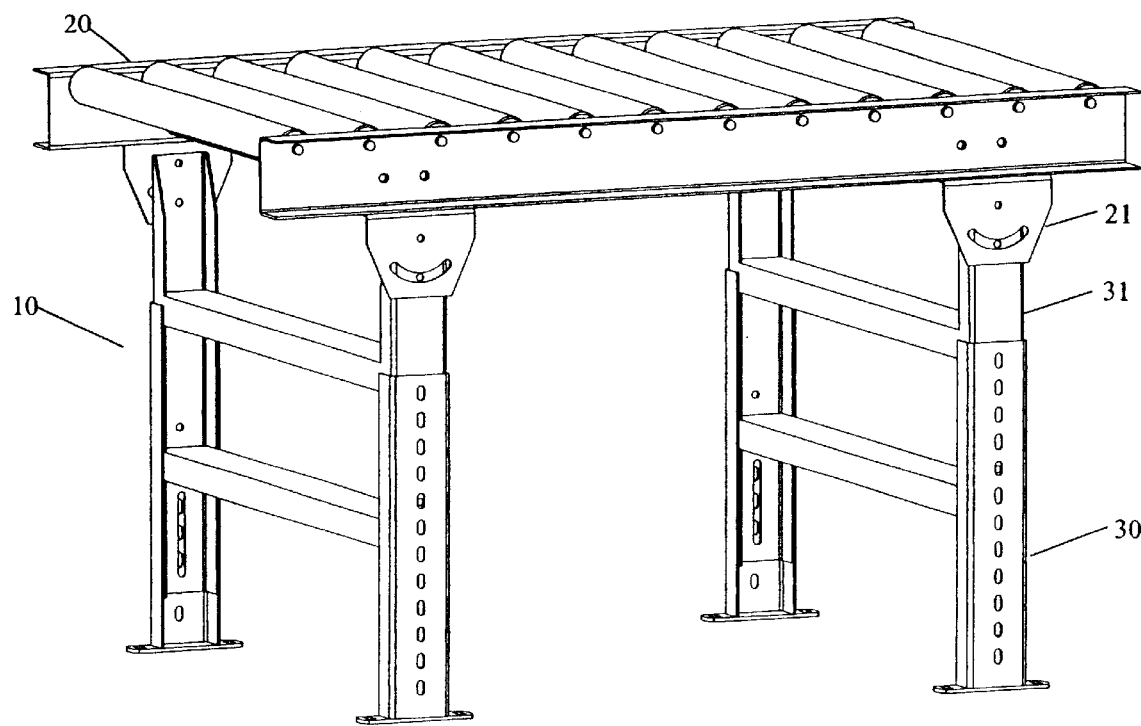
FIG. 1 is a perspective view of a typical unmodified piece of equipment.

FIG. 1 is a perspective view of a typical unmodified piece of equipment 10, such as a table or conveyor. The table may have a support element 20 that supports an article placed on the piece of equipment, a connection element 21 connected to the support element 20 in one or more places (four are shown in FIG. 1), one or more support members 31 (two are shown in FIG. 1) that support the support element 20 and are connected to the support element 20 by the connection elements 21. The equipment shown in FIG. 1 may further include an adjustment member 30 that permits the height of the support members to be adjusted. As shown, this piece of equipment does not have any weighing capability so that it would be necessary to move an article to a separate scale in order to determine the weight of the article. The integrated element scale in accordance with the invention overcomes this problem and can be retrofitted onto the piece of equipment so that the article sitting on the piece of equipment may be weighed without moving the article. Now, the integrated element scale in accordance with the invention that may be retrofitted onto the above piece of equipment or any piece of equipment will be described.

Figure 2:
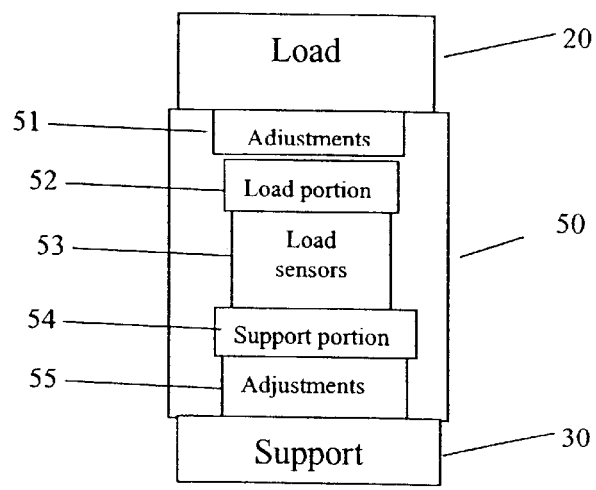
FIG. 2 is a block diagram showing the functional arrangement of the weighing elements in an integrated element in accordance with the invention.

FIG. 2 is a block diagram showing the functional arrangement of the weighing elements in an integrated element 50 in accordance with the invention that is part of the integrated element scale in accordance with the invention. The integrated element may be integrated into the support structure 30 of a piece of equipment, such as a leg assembly or strut or structural body. The integrated element 50 may incorporate one or more load sensor(s) 53, such as one or more load cell(s). The integrated element scale supports the load bearing structure 20 and creates a scale or force measurement device when connected to a well known load readout device (not shown). In more detail, a support portion 54 of the element connects the load sensor(s) 53 to the part of the equipment 30 attached to the ground. A load portion 52 of the element connects the load sensor(s) 53 to the part of the equipment supporting the load 20 as shown. The load sensing device 53, such as a load cell, one or more load cells or a load sensor, is provided between the load and support portions 52, 54. The details of the load sensing means (as well as the different types of load sensing means that may be used in the integrated element scale) are well known and are described, for example, in U.S. Pat. Nos. 5,629,489, 5,604, 336, 5,391,844, 5,336,854 and 5,313,023 that are incorporated herein by reference and are owned by the same assignee as the present application. The support portion 54 and the load portion 52 may include an attachment device (not shown, but well known) that enables existing components of load bearing equipment to be replaced with the integrated element scale in accordance with the invention. The integrated element may further include an adjustment mechanism 51 located between the load portion 52 and the load 20 and a second adjustment mechanism 55 located between the support portion 54 and the support 30 that permits the sensitivities of the integrated element scale to be adjusted as needed as is well known.

Figure 3:
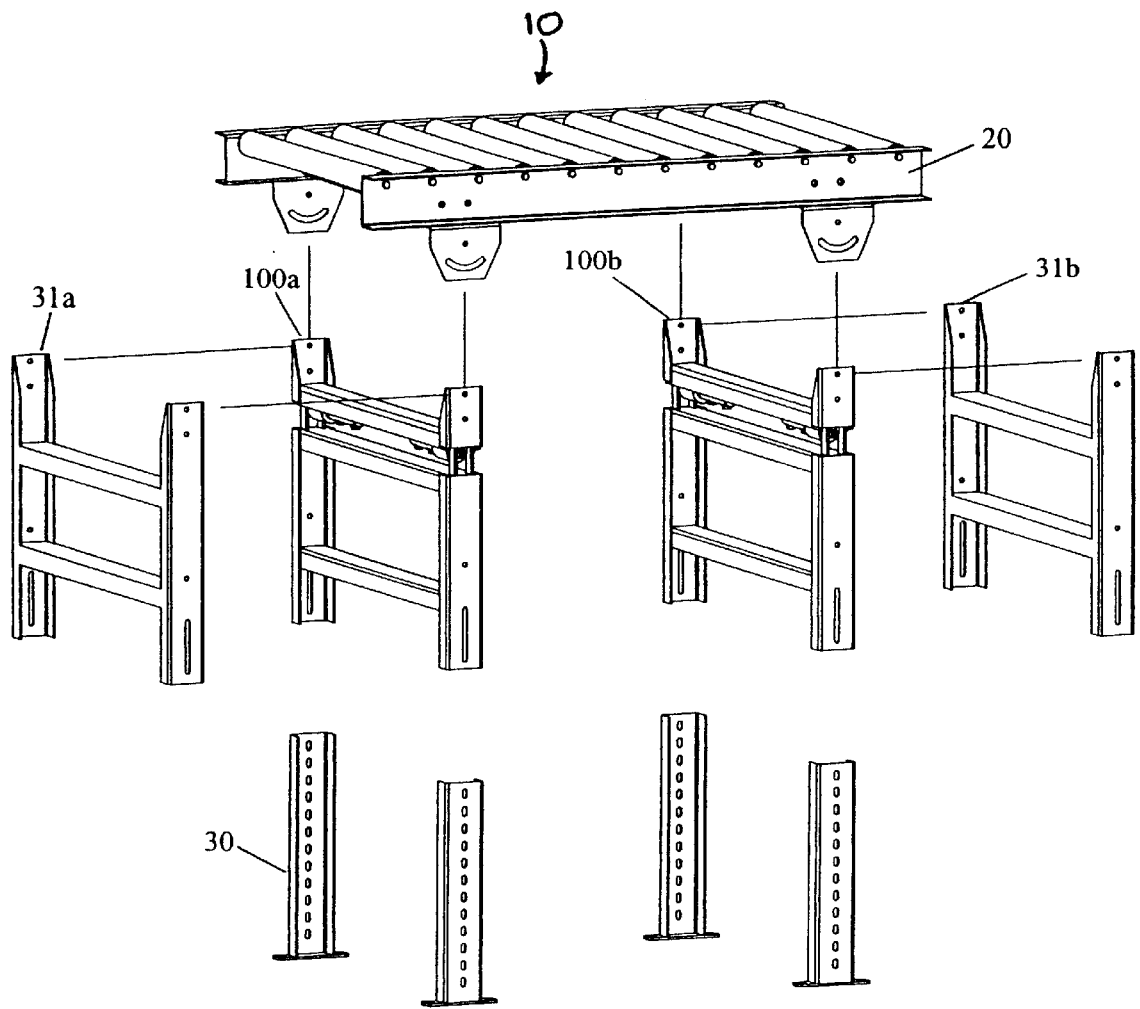
FIG. 3 is an exploded perspective view of a piece of equipment showing the replacement of the normal parts with the integral scale elements in accordance with the invention.

FIG. 3 is an exploded perspective view of the piece of equipment 10 showing the replacement of the typical support members 31a, 31b with the integral scale elements 100a, 100b in accordance with the invention. As shown, the integrated scale elements may be retrofitted to the piece of equipment 10 without modification to the piece of equipment. In this example shown in FIG. 3, the adjustment members 30 may be fitted back onto the integrated element scale elements 100a, 100b so that the height of the piece of equipment may still be adjusted. The load portion 52 and the support portion 54 and the mechanical configuration of the integrated element may be changed so that the integrated element may be retrofitted onto any piece of equipment in accordance with the invention. The details of the integrated scale element are described below with reference to FIGS. 4 through 11. In particular, below are described three different embodiments of the integrated element scale wherein a first embodiment 100 is shown in FIGS. 4A–4C and FIGS. 7 and 7A, a second embodiment 101 is shown in FIGS. 5A–5C and FIGS. 8 and 8A and a third embodiment 102 is shown in FIGS. 6A–6C and FIGS. 9 and 9A.

Each integrated element scale 100, 101, and 102 in accordance with the invention may further include various elements that enhance the usefulness/accuracy, etc. of the integrated element scale. For example, the integrated element scale may include a mechanism 52 (as shown in FIGS. 4–6) to align the load portion and support portion of the element with the load cell or load cells in between them. The integrated element may further include a mechanism 65 (as shown in FIGS. 7–11) for protecting the load cells from damage due to overload, a mechanism 63 (as shown in FIGS. 7–11) for protecting the load sensors from under load, or a mechanism for protecting against side impacts (not shown, but well known in the art). When higher accuracy is required, the integrated element further may include a mechanism 61 (shown in FIGS. 7–11) for decoupling the loads within each element from other load cells within the same element or other elements so that excessive horizontal loading between the deflecting load cells does not occur. The integrated element further may include a mechanism 67 (shown in FIGS. 7–11) for locking the element in an aligned position so it may be adjusted and tested prior to installation. Then, the tested integrated element may be assembled into the equipment ready for operation without excessive adjustments other than those already available in the component replaced. Now, three different embodiments of the integrated element scale having different decoupling mechanisms that may be included in the integrated element scale will be described.

Figure 7:
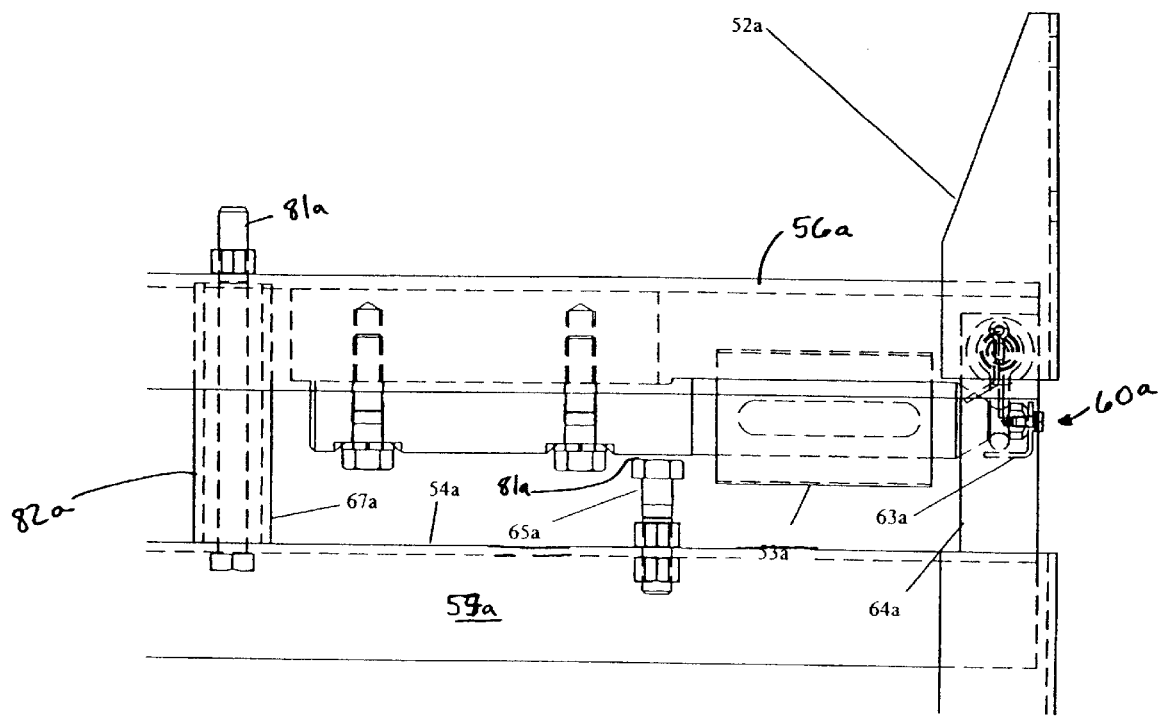
FIG. 7 is a more detailed illustration of the front view shown in FIG. 4.
Figure 7A:
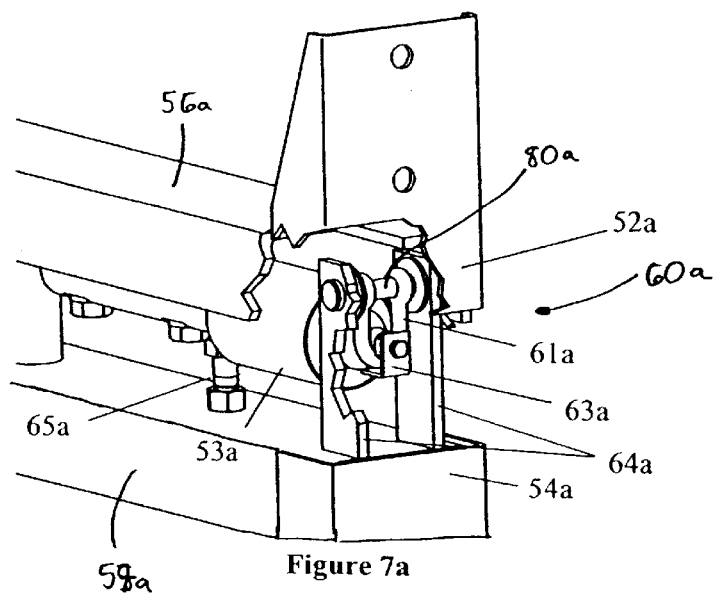
FIG. 7a is a more detailed brake-away isometric view shown in FIG. 4.

FIGS. 4A, 4B and 4C are a front elevation view, a top elevation view and a side elevation view, respectively, of one embodiment of an integrated element 100 in accordance with the invention using vertical flexures and a shackle as a decoupling mechanism. FIGS. 7 and 7A are more detailed illustration of the front view shown in FIG. 4A. As shown in FIG. 4A, the integrated element scale 100 may include an alignment-support portion 52a that aligns two or more load cells with each other and connects to alignment elements 51 (shown in FIG. 12) attached to the load so that the load is properly aligned with the integrated element scale. As shown in FIG. 4A and in more detail in FIGS. 7 and 7a, the integrated element scale may further include one or more load sensors 53a, such as a load cell described in the U.S Patents that are incorporated above by reference, that are connected to the support portion 54a as shown and measures loads as is well known. In the example shown in FIG. 4A, the integrated element scale has two load cells and FIGS. 7 and 7A are a close up of the right hand portion of FIG. 4A and thus shows only a single load cell. In addition, the description of FIGS. 7 and 7A focuses on the single load cell and it should be understood that the other load cell not shown in FIGS. 7 and 7A has the same structures associated with it. Each embodiment may also be implemented using a single load cell such as that shown in FIG. 11 so that the integrated element scale may be implemented with any number of load cells in different configurations.

The integrated element 100 may further include a first and second horizontal members 56a, 57a that are separated apart from each other by a flexing element 64a as shown. The one or more load sensors 53a are then connected to either the first or second horizontal members 56a, 57a. In a preferred embodiment, the first and second horizontal members 56a, 57a may be U-shaped members wherein the load sensors 53a and the other elements of the integrated element scale may be located inside of the U-shaped member to protect the load sensors and other elements of the integrated element scale. The integrated element scale further comprises a decoupling mechanism 60a. The decoupling mechanism, in this embodiment, further comprises a hanging element 61a, such as the U-shaped shackle shown in FIG. 7A, and a flexing element 64a located between the first and second horizontal members 56a, 57a shown in FIGS. 7 and 7a that provide the decoupling of the loads within each element from other load cells within the same element or other elements so that horizontal loading between the deflecting load cells is reduced. The decoupling mechanism 60a further comprises a pin 80a that is rigidly connected to each horizontal member 55a, 57a and is rotatably connected to the hanging element 61a so that the hanging element swings in one direction (along a horizontal force direction) but not along the other direction (in the direction of vertical force).

The integrated element shown in FIGS. 7 and 7a, further include an adjustable stop mechanisms 65a for protecting the load cells 53a (only one load cell is shown in FIGS. 7 and 7A) from damage due to overload. In the embodiment shown in FIGS. 7 and 7A, the adjustable stop mechanism is a bolt that has been fixed into a particular position such that there is a predetermined gap 81a between the top of the bolt and the load cell so that the load cell cannot be deflected more than that amount. The adjustable stop mechanism in accordance with the invention may also be other devices that perform the function of limiting the movement of the load cell during an overload. The integrated element further comprises a bale mechanism 63a for protecting the load cell from becoming disconnected due to an underload. The hanging element 61a also serve to protect the load cells from damage due to side impacts since the force the side impact will not be transferred to the load cell. The integrated element shown in FIG. 7 further includes a fixing mechanism 67a for locking the element in an aligned position so it may be adjusted and tested prior to installation. As shown in FIG. 4, this embodiment of the integrated element scale may have a fixing mechanism 67a associated with each load cell. The fixing mechanism permits the load cells to be pre-calibrated and tested prior to installation without having to recalibrate the load cells once the element is installed since the element is locked into an aligned position by the fixing mechanism. In the embodiment shown in FIG. 7, the fixing mechanism may be a bolt 81a with a sleeve 82a wherein the sleeve maintains the separation between the first and second horizontal elements 56a, 57a so that the load cells are locked into an aligned position. The fixing mechanism in accordance with the invention also may be any other device or element that will maintain the separation of the first and second horizontal elements. Now, another embodiment of the integrated element scale will be described.

Figure 8:
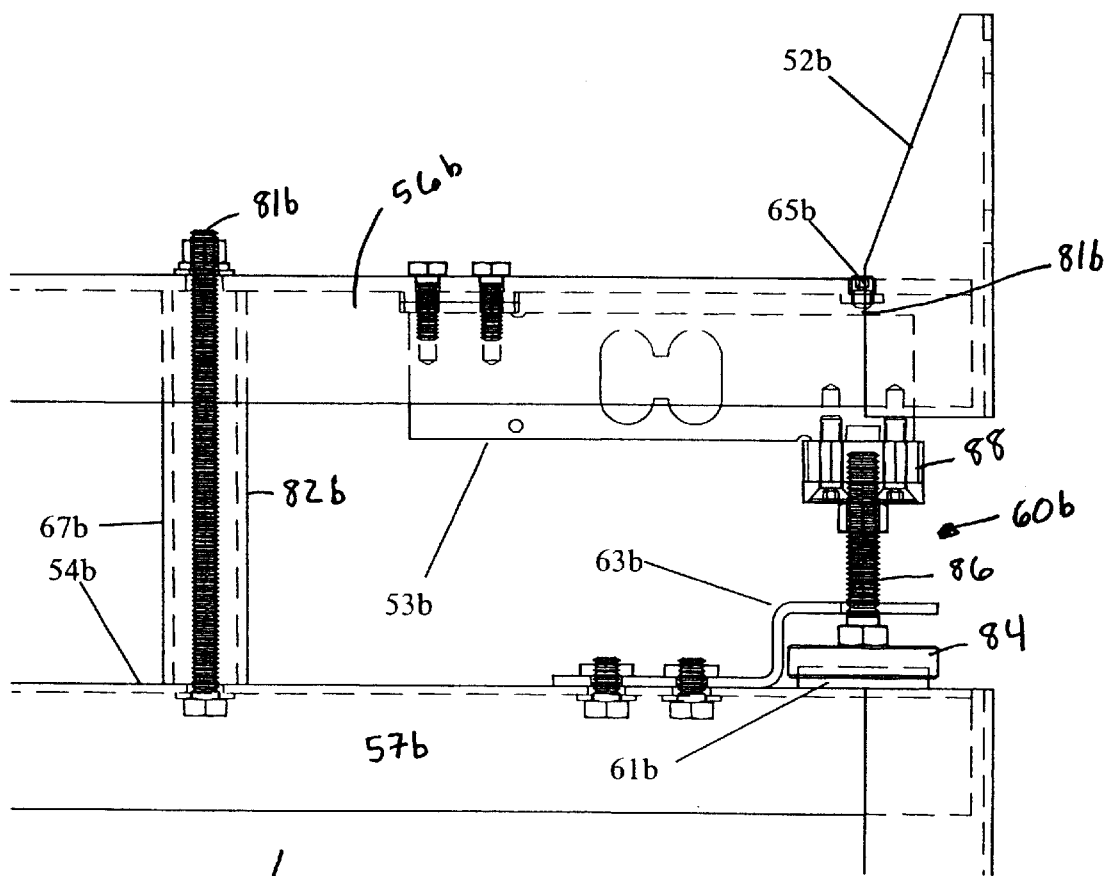
FIG. 8 is a more detailed illustration of the front view shown in FIG. 5.
Figure 8A:
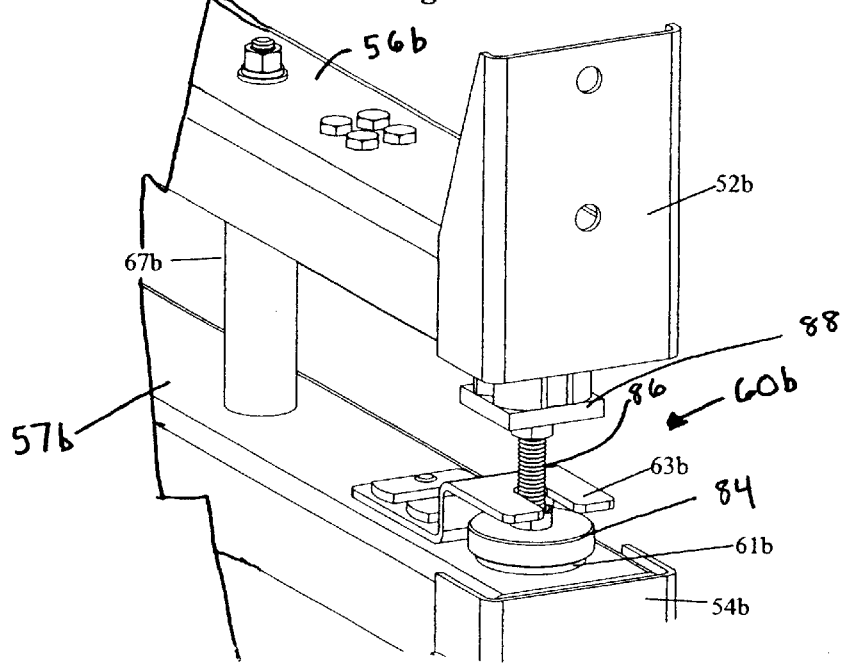
FIG. 8a is a more detailed brake-away isometric view shown in FIG. 5.

FIGS. 5A, 5B and 5C are a front elevation view, a top elevation view and a side elevation view, respectively, of another embodiment of an integrated element 101 in accordance with the invention using a rubber supports as a decoupling mechanisms. FIGS. 8 and 8a are more detailed illustration of the front view shown in FIG. 5A. As shown in FIG. 5A, the integrated element scale 101 may include an alignment-support portion 52b that aligns two or more load cells with each other and connects to alignment elements 51 (shown in FIG. 12) attached to the load so that the load is properly aligned with the integrated element scale. As shown in FIG. 5A and in more detail in FIGS. 8 and 8a, the integrated element scale may further include one or more load sensors 53b, such as a load cell described in the U.S Patents that are incorporated above by reference, that are connected to the support portion 54b as shown and measures loads as is well known. In the example shown in FIG. 5A, the integrated element scale has two load cells and FIGS. 8 and 8A are a close up of the right hand portion of FIG. 5A and thus shows only a single load cell. In addition, the description of FIGS. 8 and 8A focuses on the single load cell and it should be understood that the other load cell not shown in FIGS. 8 and 8A has the same structures associated with it. Each embodiment may also be implemented using a single load cell such as that shown in FIG. 11 so that the integrated element scale may be implemented with any number of load cells in different configurations.

The integrated element 101 may further include a first and second horizontal members 56b, 57b that are separated apart from each other by two fixing mechanisms 67b as shown. The one or more load sensors 53b are then connected to either the first or second horizontal members 56b, 57b. In a preferred embodiment, the first and second horizontal members 56b, 57b may be U-shaped members wherein the load sensors 53b and the other elements of the integrated element scale may be located inside of the U-shaped member to protect the load sensors and other elements of the integrated element scale. The integrated element scale further comprises a decoupling mechanism 60b. The decoupling mechanism 60b may further comprise a flexible pad elements 61b shown in FIGS. 8 and 8a that provide the decoupling of the loads within each element from other load cells within the same element or other elements so that horizontal loading between the deflecting load cells is reduced. In a preferred embodiment, the flexible pad element may be made of rubber. The decoupling mechanism 60b further comprises a disk 84 made out of a suitable material, such as metal, that rests on top of the flexible pad element and a bolt 86 that is connected to the disk. The other end of the bolt 86 is connected to the load cell 53b with a connector 88.

The integrated element 101 shown in FIGS. 8 and 8a further includes an adjustable stop mechanisms 65b for protecting the load cells 53b (only one load cell is shown in FIGS. 8 and 8A) from damage due to overload. In the embodiment shown in FIGS. 8 and 8A, the adjustable stop mechanism is a bolt that has been fixed into a particular position such that there is a predetermined gap 81b between the top of the bolt and the load cell so that the load cell cannot be deflected more than that amount. The adjustable stop mechanism in accordance with the invention may also be other devices that perform the function of limiting the movement of the load cell during an overload. The integrated element further comprises a fork mechanism 63b for protecting the load cells from becoming disconnected due to under load. In the embodiment shown in FIG. 8A, the fork mechanism is a piece of metal with a U-shaped cutout in which the bolt 86 of the decoupling mechanism rests. The flexible pad 61b also serve to protecting the load cells from damage due to side impacts.

The integrated element shown in FIGS. 8 and 8A further include a fixing mechanism 67b for locking the element in an aligned position so it may be adjusted and tested prior to installation. As shown in FIG. 5A, this embodiment of the integrated element scale may have a fixing mechanism 67b associated with each load cell. The fixing mechanism permits the load cells to be pre-calibrated and tested prior to installation without having to recalibrate the load cells once the element is installed since the element is locked into an aligned position by the fixing mechanism. In the embodiment shown in FIG. 8, the fixing mechanism may be a bolt 81b with a sleeve 82b wherein the sleeve maintains the separation between the first and second horizontal elements 56b, 57b so that the load cells are locked into an aligned position. The fixing mechanism in accordance with the invention also may be any other device or element that will maintain the separation of the first and second horizontal elements. Now, another embodiment of the integrated element scale will be described.

Figure 9:
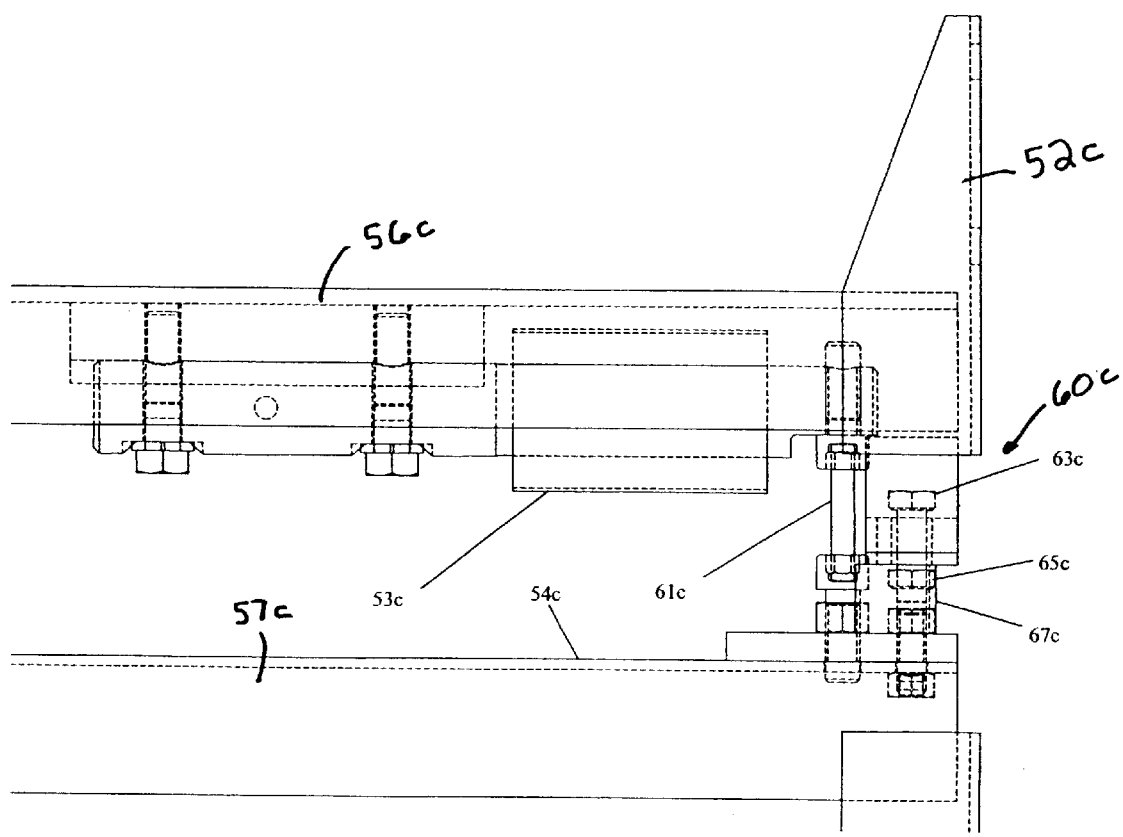
FIG. 9 is a more detailed illustration of the front view shown in FIG. 6.
Figure 9A:
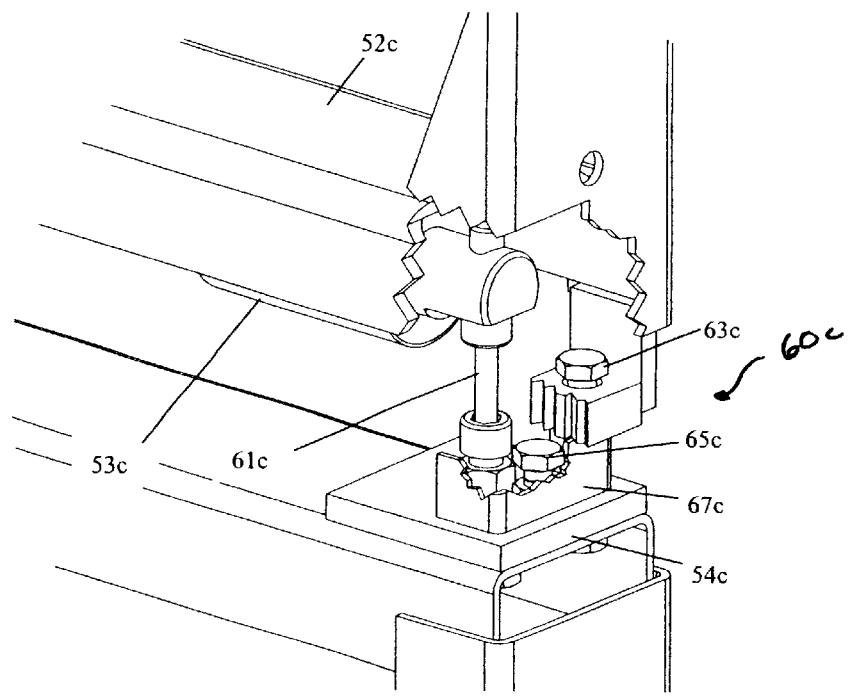
FIG. 9a is a more detailed brake-away isometric view shown in FIG. 6.

FIGS. 6A, 6B and 6C are a front elevation view, a top elevation view and a side elevation view, respectively, of another embodiment of an integrated element 102 in accordance with the invention using a rocker pin and cups as a decoupling mechanism. FIGS. 9 and 9a are more detailed illustrations of the front view shown in FIG. 6A. As shown in FIG. 6A, the integrated element scale 102 may include an alignment-support portion 52c that aligns two or more load cells with each other and connects to alignment elements 51 (shown in FIG. 12) attached to the load so that the load is properly aligned with the integrated element scale. As shown in FIG. 6A and in more detail in FIGS. 9 and 9a, the integrated element scale may further include one or more load sensors 53c, such as a load cell described in the U.S Patents that are incorporated above by reference, that are connected to the support portion 54c as shown and measures loads as is well known. In the example shown in FIG. 6A, the integrated element scale has two load cells and FIGS. 9 and 9A are a close up of the right hand portion of FIG. 6A and thus shows only a single load cell. In addition, the description of FIGS. 9 and 9A focuses on the single load cell and it should be understood that the other load cell not shown in FIGS. 9 and 9A has the same structures associated with it. Each embodiment may also be implemented using a single load cell such as that shown in FIG. 11 so that the integrated element scale may be implemented with any number of load cells in different configurations.

The integrated element 102 may further include a first and second horizontal members 56c, 57c that are separated apart from each other by two decoupling mechanisms 60c as shown.

The one or more load sensors 53c are then connected to either the first or second horizontal members 56c, 57c. In a preferred embodiment, the first and second horizontal members 56c, 57c may be U-shaped members wherein the load sensors 53c and the other elements of the integrated element scale may be located inside of the U-shaped member to protect the load sensors and other elements of the integrated element scale. The integrated element scale further comprises a decoupling mechanism 60c. The decoupling mechanism further comprises the rocking elements 61c shown in FIGS. 9 and 9a that provide the decoupling of the loads within each element from other load cells within the same element or other elements so that horizontal loading between the deflecting load cells does not occur since the rocking elements transmit vertical force to the load cell, but rock and do not transmit horizontal force to the load cell. The integrated element shown in FIGS. 9 and 9a further include an adjustable stop mechanisms 65c for protecting the load cells 53c from damage due to overload and a second adjustable stop mechanisms 63c for protecting the load cells from becoming disconnected due to under load. In the embodiment shown in FIGS. 9 and 9A, the adjustable stop mechanisms are bolts that has been fixed into a particular position such that there is a predetermined gap between the top of the bolt and the load cell so that the load cell cannot be deflected more than that amount. The adjustable stop mechanisms in accordance with the invention may also be other devices that perform the function of limiting the movement of the load cell during an overload. The adjustable stop mechanism 63c also may serve to protect the load cells from damage due to side impacts. The integrated element shown in FIGS. 9 and 9a may further include fixing mechanisms 67c for locking the element in an aligned position by closing the non critical gap of 63c so it may be adjusted and tested prior to installation. The fixing mechanism in accordance with the invention also may be any other device or element that will maintain the separation of the first and second horizontal elements.

Figure 10:
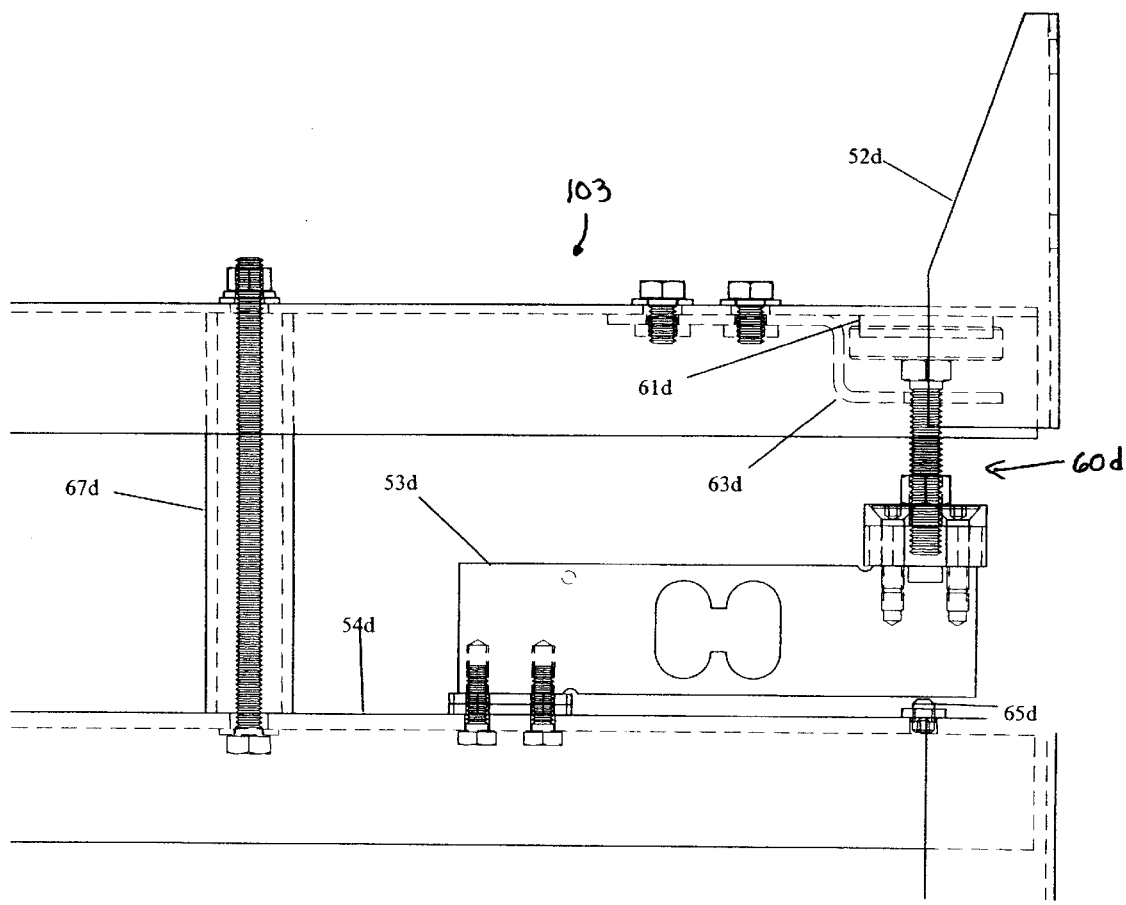
FIG. 10 is a detailed view, similar to the front view shown in FIG. 6A, where the load cell and decoupling mechanism are inverted.

FIG. 10 is a detailed view, similar to the front view shown in FIG. 6A, of another embodiment of the integrated element scale 103 wherein the load cell 53d and the decoupling mechanism 60d are inverted. In accordance with the invention, the exact positioning of the load cells and the decoupling mechanisms in the integrated element can be changes and any configuration is within the scope of the invention. As shown in FIG. 10, this embodiment of the integrated element has all of the same elements as described above and operates in the same manner so that the elements and the operation of the integrated element will not be described here. Now, another embodiment of the invention using a single load cell will be described.

Figure 11:
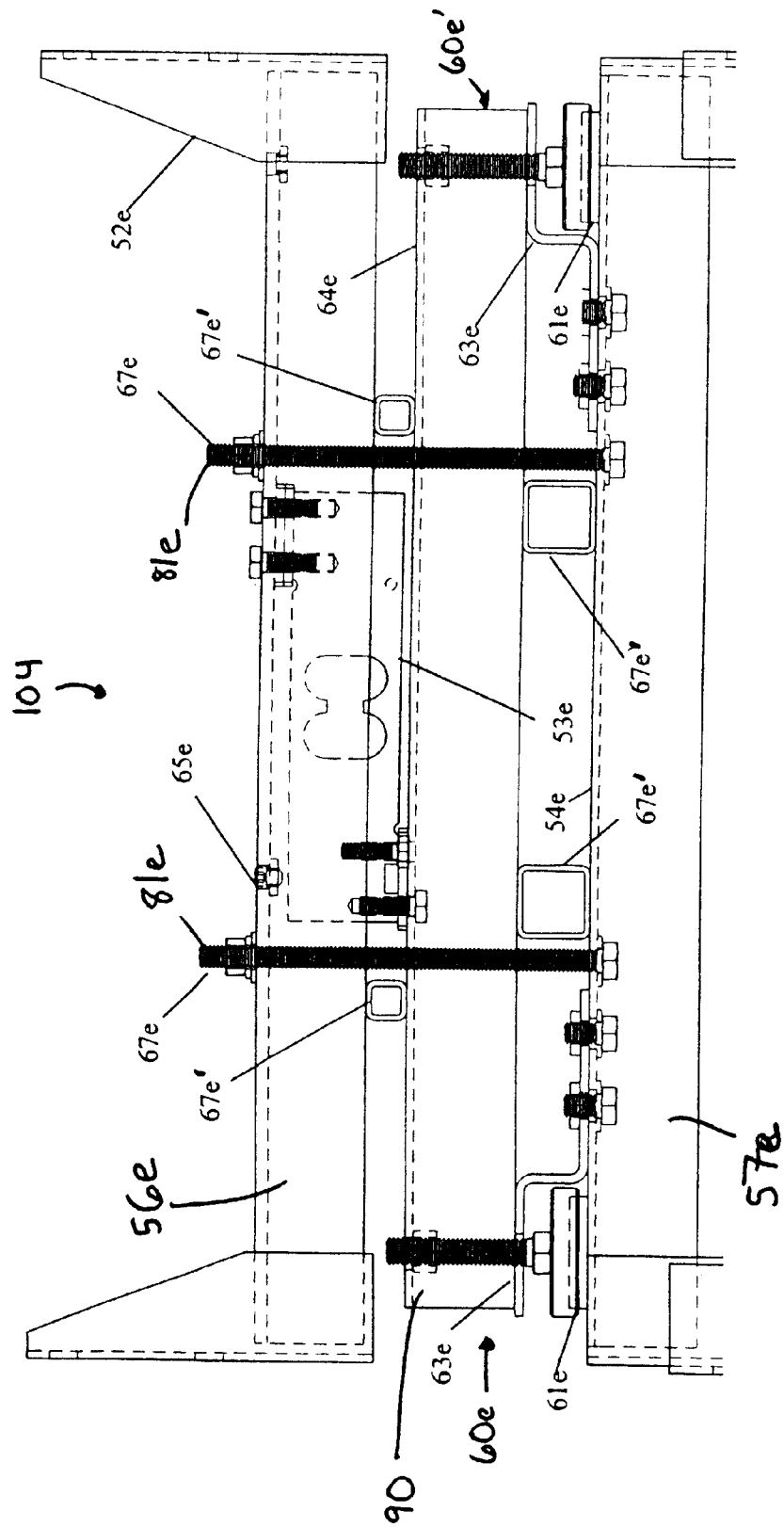
FIG. 11 is a detailed view of the front view of one embodiment of the invention showing a single load cell in use.

FIG. 11 is a detailed view of the front view of another embodiment of the integrated element 104 in accordance with the invention having a single load cell 53e in combination with two decoupling elements 60e, 60e' separated by a distance providing alignment in one direction. As with the embodiment shown in FIG. 10, the other elements described above are also present in this embodiment and will not be described herein. This embodiment further comprises a third horizontal member 90 located in between the first and second horizontal members 56e, 57e wherein the decoupling mechanisms 60e, 60e' are connected to the third horizontal element 90 and the load cell 53e is connected to the third horizontal element. Furthermore, in this embodiment, the fixing mechanism 67e comprises the bolts 81e, but also comprises spacers 67e' placed in between the first, second and third horizontal elements 56e, 57e, 90 that maintain the predetermined relationship between the horizontal members which is locked into position using the bolts 81e.

Figure 12:
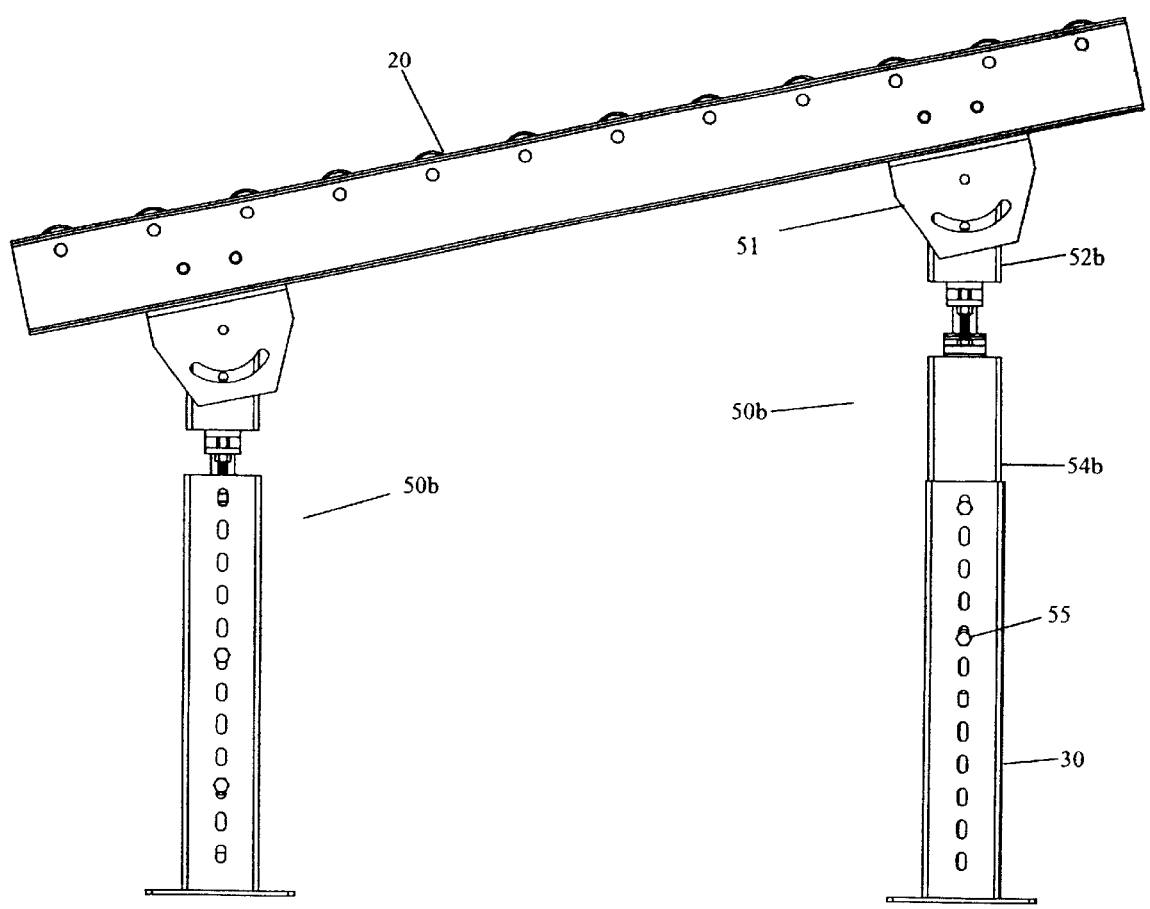
FIG. 12 is the front view of the integrated element scale in accordance with the invention installed in equipment showing adjustments in use.

FIG. 12 is the front view of the integrated element scale in accordance with the invention installed in equipment showing adjustments 51 and 55 in use wherein the piece of equipment is now tilted downwards, but still is able to measure the weigh of an article on the piece of equipment in accordance with the invention.

Different embodiment of the integrated element scale in accordance with the invention may include one or more additional elements/features. For example, versions of the invention may contain decoupling means as well as alignment means that enable the load sensing element or elements to provide more accurate load measurements. Other versions of the invention may provide adjustment means that provide adjustment in position and/or alignment of the supported structure. Yet other versions of the invention may contain restraining means that limit movement and loads in one or more degrees of freedom. Other versions of the invention may contain load-modifying means that adjusts the magnitude and direction of the load applied to the load sensing means, where parallel springs, flexures or pivots are used or where electronic gain adjustment is provided.

The elements shown above in the preferred embodiment may be implemented in various different manners. For example, the support portion 54 may include a plate, tube, structural part, molded part or fabricated or formed part, that attaches the functional measuring parts to structure supporting the load to be measured. The support portion may include plates, brackets, feet, and pinned or bolted joints with holes or connecting features. The connecting features being mating surfaces, splined or keyed members. The load portion 52 may include a plate, tube, structural part, molded part or fabricated or formed part, that attaches the functional measuring parts to structure referenced to a fixed reference relative to the load to be measured. The load portion may include plates, brackets, feet, and pinned or bolted joints with holes or connecting features. The connecting features being mating surfaces, splined or keyed members.

The load sensing means is a load transducer that produces a movement or output related to a load produced by a perturbing force. The movement may be linear, rotational or defined by a path, the movement then used to produce a function such a switching, enabling, stopping or starting or measuring. An output may be defined by an electrical characteristic such as current or voltage, or a time related character such as period or frequency, or a force related character such as pressure or load, or an alignment such as a pointer to a scale. The attachment means include fittings, bolts, threaded joints, sliding joints, pivoting joints, fixing joints and other means of connecting two structures together. The decoupling means reduces or eliminates movements or forces effecting the load sensing means to cause undesired output from or damage to the sensing means. The decoupling means may include chains, flexures, cables, balls, rocker pins, rubber supports, slender tension rods, wires, or any other means that may reduce load to the load sensors in at least one horizontal direction. The alignment means enables adjustment of position and orientation to the support and load. The alignment means may include flexures, pivots, pins, rods, chains, shackles, balls and cups, or any other means that can limit movement in at least one direction. The adjustment means enables movement between the support and the load. The restraining means prevents alignments within the load sensing means from moving during installation, and prevents loads from damaging the load sensors when they are excessive or misaligned. Finally, the load-modifying means enables magnitude and direction adjustment of the load on the load sensor or sensors. This may be a lever or system of levers containing a pivot or flexure or combination of pivots or flexures. Parallel springs may be used to adjust the magnitude of the force applied to the force sensors. Parallel springs made from the same material can reject the material effects on the force applied to the force sensors or load cells while adjusting the load magnitude (refer to U.S. Pat. No. 5,313,023). Electronic gain adjustment means may serve as a magnitude adjustment when electronic sensors are utilized in the elements.

When a pair of the invention were used as replacement supports in an existing conveyor system, inexperienced technicians completed the scale installation in a very short period. The scale functioned correctly without adjustments. The conveyor functioned normally while weighing items as they traveled across the instrumented section. While the foregoing has been with reference to a particular embodiment of the invention, it will be appreciated by those skilled in the art that changes in this embodiment may be made without departing from the principles and spirit of the invention.

What is claimed is:

1. A piece of equipment having an integrated scale, comprising:
   a surface that supports an article;
   a structure that supports the surface; and
   an integrated element scale, that is capable of weighing an article on the surface of the piece of equipment, integrated into the support structure of the piece of equipment;
   the integrated element scale further comprising a support section that connects to the support structure, a sensor section, connected to the support section, with at least one force sensing means, a load section, connected to the sensor section and the surface of the piece of equipment, that transfers the weight of the article to the sensor section and a fixing means that fixes the positional relationship between the support section and the sensor section so that the force sensing means is pre-calibrated prior to installation into the piece of equipment.

2. The piece of equipment of claim 1, wherein the sensor section further comprises at least two force decoupling means separated by a distance to provide alignment in at least one direction, and wherein the fixing means further comprises means for fixing the positional relationship between the support section, the sensor section and the force decoupling means so that the force sensing means is pre-calibrated prior to installation into the piece of equipment.

3. The piece of equipment of claim 2, wherein the force sensing means further comprises a first load cell and a second load cell and wherein the fixing means further comprises a first fixing means associated with the first load cell and a second fixing means associated with the second load cell.

4. The piece of equipment of claim 3, wherein the integrated element scale further comprises a first horizontal member and a second horizontal member wherein the sensor section is between the first and second horizontal members and wherein the fixing means further comprise a sleeve that separates the first and second horizontal members by a predetermined distance and a bolt that secures the first and second horizontal members wit the predetermined distance therebetween.

5. The piece of equipment of claim 3, wherein the integrated element scale further comprises a first horizontal member, a second horizontal member and a third horizontal member wherein the sensor section is between the first and second horizontal members and wherein the fixing means further comprise one or more spacers wherein the spacers separate the first, second and third horizontal members by predetermined distances and a bolt secures the first, second and third horizontal members with the predetermined distances therebetween.

6. The piece of equipment of claim 1, wherein the force sensing means further comprises a single load cell.

7. The piece of equipment of claim 6, wherein the single load cell is located in the middle of the integrated element scale and the force decoupling means is located at the edges of the integrated element scale.

8. The piece of equipment of claim 1, wherein the force sensing means further comprises a first load cell and a second load cell.

9. The piece of equipment of claim 8, wherein the first and second load cells are located at opposite ends of the integrated element scale and wherein a force decoupling means is located adjacent each load cell.

10. The piece of equipment of claim 1, wherein the force decoupling means further comprises a shackle element that transfers vertical forces to the force sensing means but does not transfer horizontal forces to the force sensing means.

11. The piece of equipment of claim 1, wherein the force decoupling means further comprises a flexible pad element that transfers vertical forces to the force sensing means but does not transfer horizontal forces to the force sensing means.

12. The piece of equipment of claim 1, wherein the force decoupling means further comprises a rocker element that transfers vertical forces to the force sensing means but does not transfer horizontal forces to the force sensing means.

13. The piece of equipment of claim 1, wherein the integrated element scale further comprises adjustment means for adjusting the load section and the support section.

14. The piece of equipment of claim 1, wherein the integrated element scale further comprises an adjustable stop member for preventing damage to the force sensing means during an overload condition.

15. An integrated element scale that is capable of weighing an article on a piece of equipment that is integrated into the support structure of the piece of equipment, the integrated element scale comprising:
   a support section that connects to the piece of equipment, a sensor section, connected to the support section, with at least one force sensing means, a load section, connected to the sensor section and the piece of equipment, that transfers the weight of the article to the sensor section and a fixing means that fixes the positional relationship between the support section and the sensor section so that the force sensing means is pre-calibrated prior to installation into the piece of equipment.

16. The scale of claim 15, wherein the sensor section further comprises at least two force decoupling means separated by a distance to provide alignment in at least one direction, and wherein the fixing means further comprises means for fixing the positional relationship between the support section, the sensor section and the force decoupling means so that the force sensing means is pre-calibrated prior to installation into the piece of equipment.

17. The scale of claim 16, wherein the force sensing means further comprises a first load cell and a second load cell and wherein the fixing means further comprises a first fixing means associated with the first load cell and a second fixing means associated with the second load cell.

18. The scale of claim 17 further comprising a first horizontal member and a second horizontal member wherein the sensor section is between the first and second horizontal members and wherein the fixing means further comprise a sleeve that separates the first and second horizontal members by a predetermined distance and a bolt that secures the first and second horizontal members with the predetermined distance therebetween.

19. The scale of claim 17 further comprising a first horizontal member, a second horizontal member and a third horizontal member wherein the sensor section is between the first and second horizontal members and wherein the fixing means farther comprise one or more spacers wherein the spacers separate the first, second and third horizontal members by predetermined distances and a bolt secures the first, second and third horizontal members with the predetermined distances therebetween.

20. The scale of claim 15, wherein the force sensing means further comprises a single load cell.

21. The scale of claim 20, wherein the single load cell is located in the middle of the integrated element scale and the force decoupling means is located at the edges of the integrated element scale.

22. The scale of claim 15, wherein the force sensing means further comprises a first load cell and a second load cell.

23. The scale of claim 22, wherein the first and second load cells are located at opposite ends of the integrated element scale and wherein a force decoupling means is located adjacent each load cell.

24. The scale of claim 15, wherein the force decoupling means further comprises a shackle element that transfers vertical forces to the force sensing means but does not transfer horizontal forces to the force sensing means.

25. The scale of claim 15, wherein the force decoupling means further comprises a flexible pad element that transfers vertical forces to the force sensing means but does not transfer horizontal forces to the force sensing means.

26. The scale of claim 15, wherein the force decoupling means further comprises a rocker element that transfers vertical forces to the force sensing means but does not transfer horizontal forces to the force sensing means.

27. The scale of claim 15 further comprising adjustment means for adjusting the load section and the support section.

28. The scale of claim 15 further comprising an adjustable stop member for preventing damage to the force sensing means during an overload condition.

29. A method for retrofitting a piece of equipment with an integrated element scale, the method comprising:
    fixing the positional relationship between a support section and a sensor section in the integrated element scale so that a force sensor is pre-calibrated prior to installation into the piece of equipment:
    removing the support structure of the piece of equipment; and
    placing an integrated element scale onto the piece of equipment so that the piece of equipment is able to weigh an article resting on the piece of equipment using the integrated element scale.

30. A piece of equipment having an integrated scale, comprising:
    a surface that supports an article;
    a structure that supports the surface; and
    an integrated element scale, that is capable of weighing an article on the surface of the piece of equipment, integrated into the support structure of the piece of equipment;
    the integrated element scale further comprising a support section that connects to the support structure, a sensor section, connected to the support section, with at least one force sensor, a load section, connected to the sensor section and the surface of the piece of equipment, that transfers the weight of the article to the sensor section, and a device that fixes the positional relationship between the support section and the sensor section so that the force sensor is pre-calibrated prior to installation into the piece of equipment.

31. The piece of equipment of claim 30, wherein the sensor section further comprises at least two force decouplers separated by a distance to provide alignment in at least one direction, and wherein the fixing device further comprises a device that fixes the positional relationship between the support section, the sensor section and the force decouplers so that the force sensor is pre-calibrated prior to installation into the piece of equipment.

32. The piece of equipment of claim 31, wherein the force sensor further comprises a first load cell and a second load cell and wherein the fixing device further comprises a first fixing device associated with the first load cell and a second fixing device associated with the second load cell.

33. The piece of equipment of claim 32, wherein the integrated element scale further comprises a first horizontal member and a second horizontal member wherein the sensor section is between the first and second horizontal members and wherein the fixing devices further comprise a sleeve that separates the first and second horizontal members by a predetermined distance and a bolt that secures the first and second horizontal members with the predetermined distance therebetween.

34. The piece of equipment of claim 32, wherein the integrated element scale further comprises a first horizontal member, a second horizontal member and a third horizontal member wherein the sensor section is between the first and second horizontal members and wherein the fixing devices further comprise one or more spacers wherein the spacers separate the first, second and third horizontal members by predetermined distances and a bolt secures the first, second and third horizontal members with the predetermined distances therebetween.

35. The piece of equipment of claim 30, wherein the force sensor further comprises a single load cell.

36. The piece of equipment of claim 35, wherein the single load cell is located in the middle of the integrated element scale and the force decoupler is located at the edges of the integrated element scale.

37. The piece of equipment of claim 30, wherein the force sensor further comprises a first load cell and a second load cell.

38. The piece of equipment of claim 37, wherein the first and second load cells are located at opposite ends of the integrated element scale and wherein a force decoupler is located adjacent each load cell.

39. The piece of equipment of claim 30, wherein the force decoupler further comprises a shackle element that transfers vertical forces to the force sensor but does not transfer horizontal forces to the force sensor.

40. The piece of equipment of claim 30, wherein the force decoupler further comprises a flexible pad element that transfers vertical forces to the force sensor but does not transfer horizontal forces to the force sensor.

41. The piece of equipment of claim 30, wherein the force decoupler further comprises a rocker element that transfers vertical forces to the force sensor but does not transfer horizontal forces to the force sensor.

42. The piece of equipment of claim 30, wherein the integrated element scale further comprises an adjuster that adjusts the load section and the support section.

43. The piece of equipment of claim 30, wherein the integrated element scale further comprises an adjustable stop member that prevents damage to the force sensor during an overload condition.

44. An integrated element scale that is capable of weighing an article on a piece of equipment that is integrated into the support structure of the piece of equipment, the integrated element scale comprising:
    a support section that connects to the piece of equipment, a sensor section, connected to the support section, with at least one force sensor, a load section, connected to the sensor section and the piece of equipment, that transfers the weight of the article to the sensor section, and a device that fixes the positional relationship between the support section and the sensor section so that the force sensor is pre-calibrated prior to installation into the piece of equipment.

45. The scale of claim 44, wherein the sensor section further comprises at least two force decouplers separated by a distance to provide alignment in at least one direction, and wherein the fixing device further comprises a device that fixes the positional relationship between the support section, the sensor section and the force decouplers so that the force sensor is pre-calibrated prior to installation into the piece of equipment.

46. The scale of claim 45, wherein the force sensor further comprises a first load cell and a second load cell and wherein the fixing device further comprises a first fixing device associated with the first load cell and a second fixing device associated with the second load cell.

47. The scale of claim 46 further comprising a first horizontal member and a second horizontal member wherein the sensor section is between the first and second horizontal members and wherein the fixing devices further comprise a sleeve that separates the first and second horizontal members by a predetermined distance and a bolt that secures the first and second horizontal members with the predetermined distance therebetween.

48. The scale of claim 46 further comprising a first horizontal member, a second horizontal member and a third horizontal member wherein the sensor section is between the first and second horizontal members and wherein the fixing devices further comprise one or more spacers wherein the spacers separate the first, second and third horizontal members by predetermined distances and a bolt secures the first, second and third horizontal members with the predetermined distances therebetween.

49. The scale of claim 44, wherein the force sensor further comprises a single load cell.

50. The scale of claim 49, wherein the single load cell is located in the middle of the integrated element scale and the force decouplers are located at the edges of the integrated element scale.

51. The scale of claim 44, wherein the force sensor further comprises a first load cell and a second load cell.

52. The scale of claim 51, wherein the first and second load cells are located at opposite ends of the integrated element scale and wherein a force decouplers are located adjacent each load cell.

53. The scale of claim 44, wherein the force decouplers further comprises a shackle element that transfers vertical forces to the force sensor but does not transfer horizontal forces to the force sensor.

54. The scale of claim 44, wherein the force decouplers further comprises a flexible pad element that transfers vertical forces to the force sensor but does not transfer horizontal forces to the force sensor.

55. The scale of claim 44, wherein the force decouplers further comprises a rocker element that transfers vertical forces to the force sensor but does not transfer horizontal forces to the force sensor.

56. The scale of claim 44 further comprising an adjustment that adjusts the load section and the support section.

57. The scale of claim 44 further comprising an adjustable stop member for preventing damage to the force sensing means during an overload condition.

58. An integrated element scale that is capable of weighing an article on a piece of equipment that is integrated into the support structure of the piece of equipment, the integrated element scale comprising:

a support section that connects to the piece of equipment;

a sensor section, connected to the support section, with at least one force sensing means;

a load section, connected to the sensor section and the piece of equipment, that transfers the weight of the article to the sensor section; and means for fixing the positional relationship between the support section, and the sensor section so that the force sensing means is pre-calibrated prior to installation into the scale.

59. An integrated element scale that is capable of weighing an article on a piece of equipment that is integrated into the support structure of the piece of equipment, the integrated element scale comprising:

a support section that connects to the piece of equipment;

a sensor section, connected to the support section, with at least one force sensor, a load section, connected to the sensor section and the piece of equipment, that transfers the weight of the article to the sensor section; and a device that fixes the positional relationship between the support section, and the sensor section so that the force sensor is pre-calibrated prior to installation into the scale.

60. An integrated element scale that is capable of weighing an article on a piece of equipment that is integrated into the support structure of the piece of equipment, the integrated element scale comprising:

a support section that connects to the piece of equipment;

a sensor section, connected to the support section, with at least one force sensor and at least two force decouplers separated by a distance to provide alignment in at least one direction;

a load section, connected to the sensor section and the piece of equipment, that transfers the weight of the article to the sensor section; and a device that fixes the positional relationship between the support section, the sensor section and the force decouplers so that the force sensor is pre-calibrated prior to installation into the scale.

\* \* \* \* \*